(No Model.)
G. ERLWEIN.
FILAMENT FOR INCANDESCENT ELECTRIC LAMPS.
No. 448,915. Patented Mar. 24, 1891.
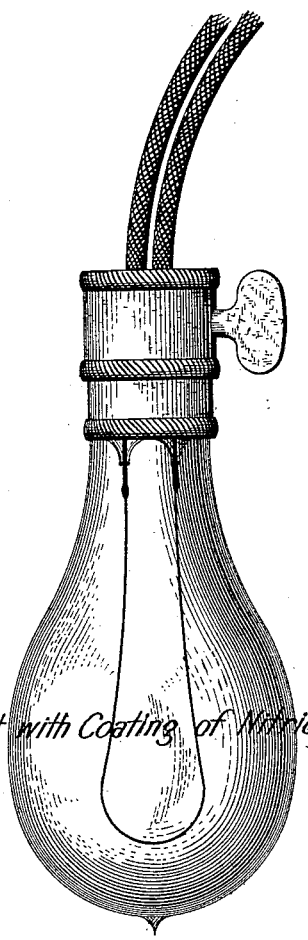
Carbon Filament with Coating of Nitride of Silicon.
Witnesses:
Percy C. Bowen
John C. Wilson
Inventor:
Georg Erlwein
By Wilkinson
Attorney.

UNITED STATES PATENT OFFICE.

GEORG ERLWEIN, OF BERLIN, GERMANY, ASSIGNOR TO SIEMENS & HALSKE, OF SAME PLACE.

FILAMENT FOR INCANDESCENT ELECTRIC LAMPS.

SPECIFICATION forming part of Letters Patent No. 448,915, dated March 24, 1891.

Application filed July 22, 1890. Serial No. 359,546. (No specimens.)

*To all whom it may concern:*

Be it known that I, GEORG ERLWEIN, doctor of philosophy, a subject of the King of Bavaria, residing at Berlin, in the Kingdom of Prussia and German Empire, have invented certain new and useful Improvements in Filaments for Electric Glow-Lamps; and I do hereby declare the following to be a full, clear, and exact description of the invention, such as will enable others skilled in the art to which it appertains to make and use the same.

My invention relates to filaments for incandescent lights; and it consists in providing filaments (preferably the ordinary carbon filaments) with a solid coating which does not melt at the temperature of the incandescent filament and protects the core of the filament against atomization or dispersion. Nitrides of silicon and boron, which remain stable at the highest temperatures, prove specially suited for this purpose, and, furthermore, since an incandescent body provided with such a coating neither loses nitrogen nor absorbs oxygen it may be made to glow even in a room filled with air. Since the nitrides of silicon and boron are very similar in their preparation and use, I shall describe the use of silicon compounds, considering like boron compounds as equivalents. Various processes for the production and deposit of these compounds are well known to chemists; but I prefer to heat the ordinary carbon filaments to incandescence within an atmosphere of volatile or vaporizable silicon compounds (preferably $SiCl_4$) and volatile nitrogen compounds, (preferably ammonia free of oxygen.) The required heat is best obtained by passing the electric current through the carbon filament. The silicon compounds in contact with the filament are reduced by the heat and form with the nitrogen of the ammonia solid nitrides of silicon, which are deposited nearly uniformly over the surface of the carbon filaments, forming a refractory and efficient coating therefor.

What I claim, and desire to secure by Letters Patent, is—

1. In incandescent electric lamps, a glow-body consisting of a carbon filament for a core, and a coating of nitride of silicon incasing the said core, substantially as described.

2. The process of preparing a filament for incandescent electric lamps by heating to incandescence a carbon filament in an atmosphere of volatile silicon compounds with nitrogen compounds free of oxygen, whereby silicon and nitrogen are simultaneously eliminated, and combining as nitrides are deposited in the filament, forming a tough and refractory coating therefor, substantially as described.

3. The process of preparing a filament for incandescent electric lamps by heating to incandescence a carbon filament in an atmosphere of volatile silicon compounds with ammonia, whereby silicon and nitrogen are simultaneously eliminated, and combining as nitrides are deposited in the filament, forming a tough and refractory coating therefor, substantially as described.

4. The process of preparing a filament for incandescent electric lamps by heating to incandescence a carbon filament in an atmosphere of silicic chloride with ammonia, whereby silicon and nitrogen are simultaneously eliminated, and combining as nitrides are deposited in the filament, forming a tough and refractory coating therefor, substantially as described.

In testimony whereof I have affixed my signature in presence of two witnesses.

GEORG ERLWEIN.

Witnesses:
ADOLF HELLER,
MAX WAGNER.